Dec. 9, 1969  G. E. GLEICHMAN  3,482,721
LIFT BED TYPE TRUCK WITH UNLOADING MEANS THEREFOR
Filed May 23, 1968  3 Sheets-Sheet 1

INVENTOR.
GEORGE E. GLEICHMAN
BY
Robert E. Breidenthal
ATTORNEY

Dec. 9, 1969  G. E. GLEICHMAN  3,482,721
LIFT BED TYPE TRUCK WITH UNLOADING MEANS THEREFOR
Filed May 23, 1968  3 Sheets-Sheet 2

INVENTOR.
GEORGE E. GLEICHMAN
BY
Robert E. Breidenthal
ATTORNEY

Dec. 9, 1969    G. E. GLEICHMAN    3,482,721
LIFT BED TYPE TRUCK WITH UNLOADING MEANS THEREFOR
Filed May 23, 1968    3 Sheets-Sheet 3
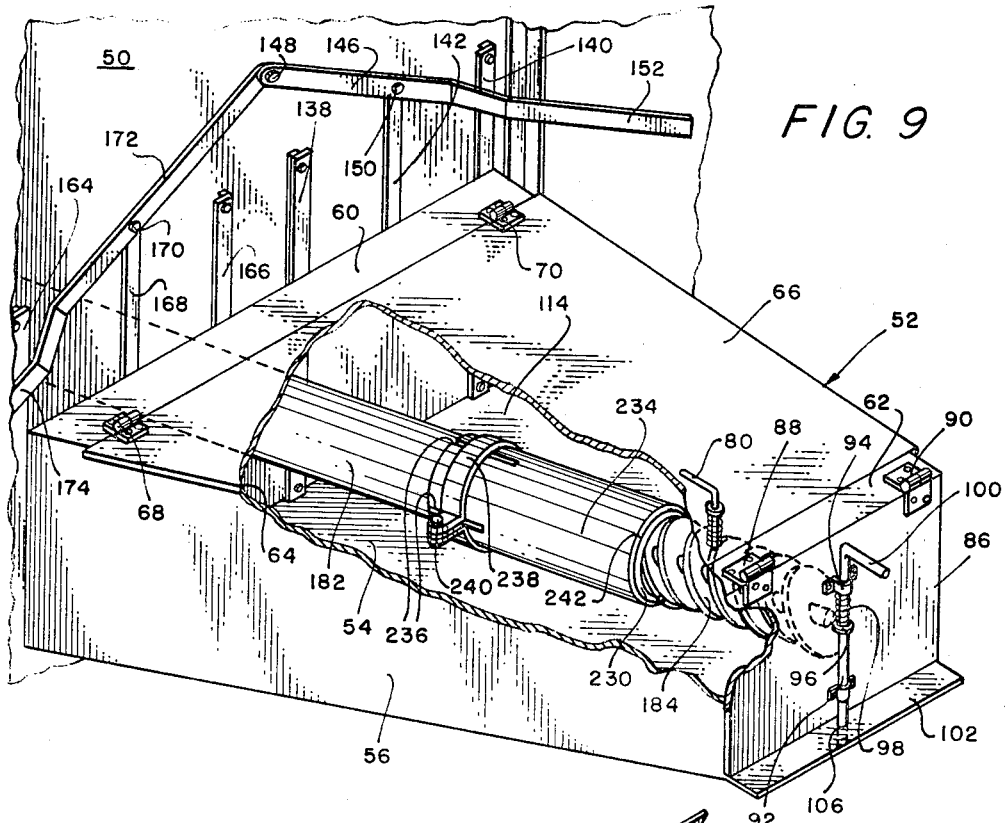
FIG. 9
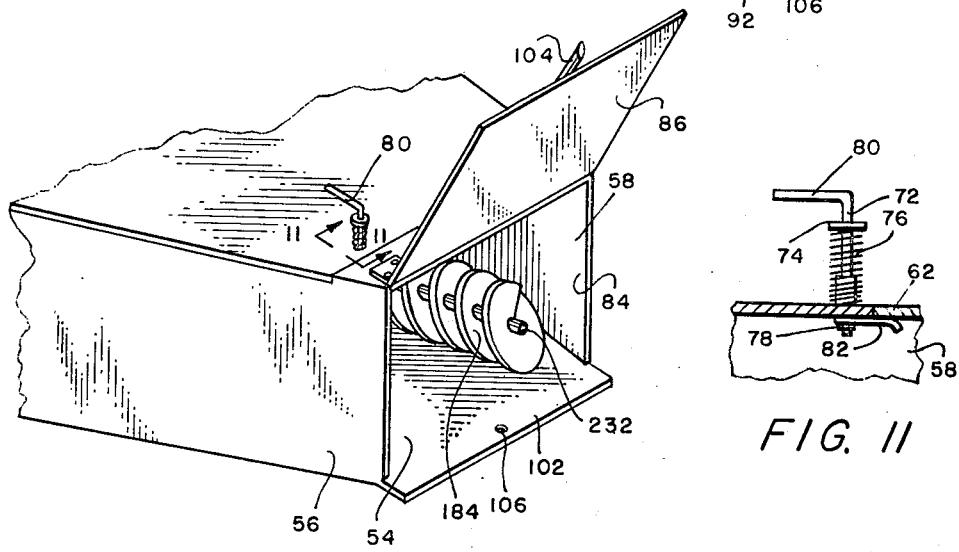
FIG. 10
FIG. 11
INVENTOR.
GEORGE E. GLEICHMAN
BY
ATTORNEY United States Patent Office 3,482,721
Patented Dec. 9, 1969

3,482,721
LIFT BED TYPE TRUCK WITH UNLOADING
MEANS THEREFOR
George E. Gleichman, 409 W. 21st St.,
Harper, Kans. 67058
Filed May 23, 1968, Ser. No. 731,505
Int. Cl. B60p 1/04, 1/00
U.S. Cl. 214—508                    18 Claims

ABSTRACT OF THE DISCLOSURE

A conventional truck of the lift bed type modified to include structure attached to and defining with the rear wall of the lift bed a housing extending rearwardly of the rear wall. The bed is partitioned to provide separate cargo compartments, and valve controlled openings provide communication between the housing and a selected compartment. An upwardly and forwardly extending auger has its inlet within the housing and its outlet disposed above the juncture of the front bed wall and one of the side bed walls, and the outlet of the auger is connected to a depending flexible conduit for directly gravity flow of augered material. The forward end of the auger and the prime mover are supported upon walls of the bed. The axial extent of the auger tube is adjustable to control the exposure of the helical auger vane within the housing, and the housing has a closable access opening through which adjustments may be made. The housing is rearwardly tapered and the rear end wall thereof is constituted of a hinged door normally closed by a latch, whereby a metered quantity of material isolated in the housing can be drained into a container.

---

The present invention relates to new and useful improvements in apparatus for unloading and more particularly pertains to attachments for a conventional lift bed type truck as well as to such a truck incorporating such attachments such that selected isolated cargo contents of the truck can be augered to and delivered gravitationally to selected sites without moving the auger.

Many activities such as agricultural activities or endeavors require the transportation to remote locations of a plurality of materials. A farmer may in the course of his work need to deliver two different materials to either two separate locations or to a single remote location. In many instances he may desire to alternately deliver relatively small quantities of first one and then the other of the two materials. For example, a farmer in the planting or the drilling of wheat may desire to load the drill or planting machine with both fertilizer and seed wheat. Ordinarily this entails a great deal of labor in that while the seed wheat may, usually with some difficulty, be augured from a truck or wagon to the drill, the fertilizer heretofore has commonly been transported in bags which must be manually carried to the drill, opened and emptied into the drill; this task being very arduous as is very well known to anyone having performed such task. Additionally, while such conventional material handling procedure is not only arduous in itself, the expense of additionally bagging the fertilizer coupled with the more difficult handling and storage of the bagged fertilizer in the warehouse raises the price of the fertilizer above that which would prevail if the fertilizer is warehoused or stored in bulk and can be sold and delivered into the truck of the purchaser in bulk condition.

The particular example discussed above is only one of many cases wherein it is desired to transport and selectively deliver two or more separate augerable (by which is meant any material which is or can be in a physical condition such that it can be elevated or moved by a conventional auger) materials to a remote location. As will be explained in greater detail hereinafter, it is the purpose of this invention, which when applied to the task of the example given above, to enable both seed wheat and fertilizer to be transported in isolation from each other in bulk condition to a remote location and then to selectively feed either the seed wheat or the fertilizer to the input of a single auger for delivery to the wheat drill.

The desirability of enabling the transport and unloading of augerable materials as roughly outlined above has long been recognized, and proposals have heretofore been made as to how such objectives might be attained. In this regard, attention is directed to U.S. Patent No. 3,024,932 entitled Compartmented Feed Body, which issued to J. N. Dodgen, Mar. 13, 1962, that is exemplary of such prior art proposals, and the instant invention is directed to improvements on such prior art proposals such as the previously identified United States patent, and the disclosure of such patent is incorporated herein by reference.

The paramount object of the instant invention is to enable unloading selected differing cargo contents of a lift type truck bed.

Another important object of the instant invention is to provide attachment apparatus such as to effect either temporary or permanent modification of a conventional lift bed type truck to realize the above mentioned paramount object.

Still another important object of the instant invention is to provide apparatus of the character above described which will include an auger provided with an inlet control enabling the rate of unloading to be regulated.

Yet another important object of the instant invention is to provide apparatus of the character specified above which will enable the gravity flow discharge of a unit volume of a selected material.

A broad aspect of the invention involves the provision of an attachment for use with trucks of the type having a planar tiltable bed provided with upstanding front, rear and side walls, said attachment comprising a vertical closure wall adapted to be secured to the walls of the bed and also adapted to constitute a portion of the rear wall of the tiltable bed, a sump structure attached to and extending rearwardly from the closure wall to define therewith a housing, said housing including a bottom wall inclined rearwardly and downwardly from adjacent the bottom of the closure wall, said closure wall being provided with a discharge opening therethrough that is adjacent the bottom of the closure wall and which opens into the interior of the housing, valve means for selectively opening and closing said discharge opening, said closure wall additionally being provided with an auger opening, and auger means for removing augerable material from within the housing, and for discharging such material at a remote location, said auger means having an inlet within the housing and a relatively elevated discharge outlet, with said auger means including an auger tube extending in closely spaced relationship through the auger opening and being inclined upwardly and forwardly.

Another aspect of the invention of the class having a flat lift bed provided with upstanding front, side and rear walls and including therewith means for unloading cargo comprising a sump structure attached to and extending rearwardly from the rear wall of the bed to define therewith a housing rearward of the rear wall of the lift bed, said housing having a horizontal transverse extent substantially less than the corresponding extent of the rear wall of the lift bed, said rear wall having a discharge opening therethrough adjacent the bottom thereof that communicates with the interior of the housing, valve means for closing the discharge opening, said rear wall having an auger accommodating opening therethrough that opens into the housing, auger means for removing and elevating augerable material from the housing, said auger means including an auger tube extending through the auger accommodating opening with the tube being inclined upwardly and forwardly from its lower end which is disposed in the housing to its upper end which is disposed at a height greater than that of the front and side walls of the lift bed, said auger means including a helical auger vane rotatable in the tube, means including a prime mover operatively connected to the vane adjacent the upper end of the tube for rotating the vane, and means depending from the tube at a position forward of the rear wall of the lift bed for supporting the auger means upon the upstanding walls of the lift bed, and means for supporting the prime mover upon the upstanding walls of the lift bed.

These and other objects and aspects of the invention as well as many important structural features thereof will manifest themselves during the ensuing description of a preferred embodiment of the invention; such embodiment being illustrated in the accompanying drawings, wherein:

FIGURE 9 is an enlarged isometric view of the sump or housing and of an adjacent portion of the rear wall of the truck bed, a portion of the housing walls being broken away to reveal the interior of the housing, and with other hidden details of the structure being shown in dashed outline;

FIGURE 10 is an enlarged fragmentary isometric view of the rear end portion of the sump or housing, and illustrates the door of the open rear end of the housing in open condition; and, FIGURE 11 is an enlarged sectional detail view taken upon the plane of the section line 11—11 in FIGURE 10.

Figure 1:
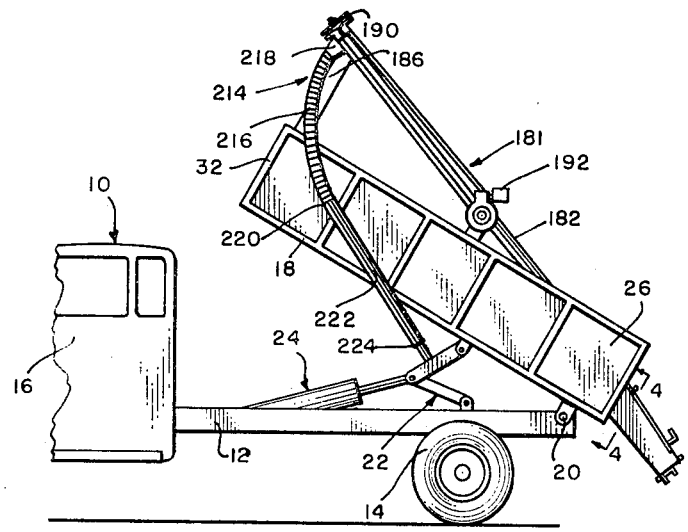
FIGURE 1 is a side elevational view of the present invention applied to a fragmentarily illustrated lift bed type truck, the lift bed being shown in its lifted position.
Figure 2:
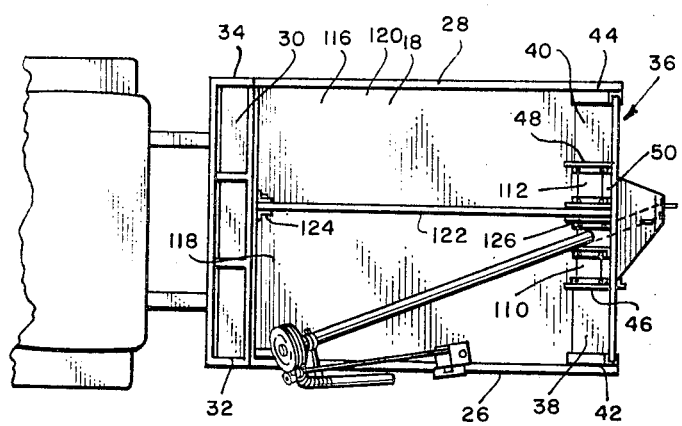
FIGURE 2 is a plan view of the structure shown in FIGURE 1, a concealed portion of the auger means being shown in dashed outline.
Figure 3:
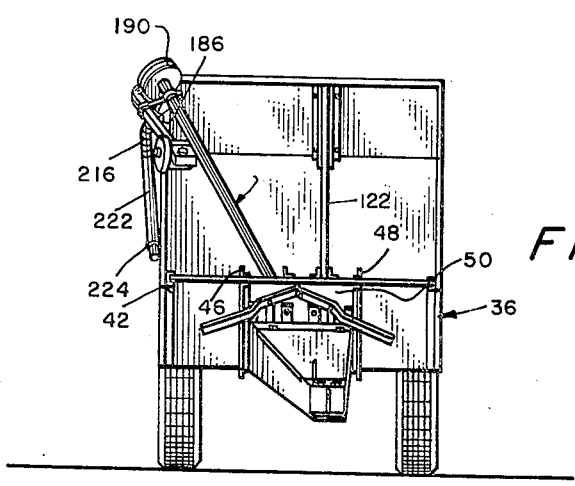
FIGURE 3 is a rear elevational view of the structure shown in FIGURES 1 and 2.

Referring now to the drawings wherein like numerals designate like parts throughout the various views, and wherein the reference numeral 10 designates generally a self-propelled lift bed type truck that is entirely conventional except as hereinafter specified. The truck 10 comprises a frame 12 supported by rear drive wheels 14 and dirigible front wheels, not shown. The truck 10 includes an operator's cab 16 disposed upon the forward end portion of the frame 12. A rectangular flat cargo bed is disposed above the truck frame 12 rearwardly of the operator's cab 16 and is pivotally mounted adjacent its rear end to the rear end of the frame 12 in the conventional manner indicated at 20 for pivotal movement about a transverse horizontal axis. The arrangement is such that the lift bed 18 can be swung from a generally horizontal position immediately overlying the frame 12, not shown, to a tilted or inclined position such as shown thereof in FIGURE 1.

Conventional linkage means designated generally at 22 is connected between the frame 22 and the bed 18 at positions forwardly of the conventional pivot mounting means 20, such connecting means 22 being operatively connected to conventional hydraulic means designated generally at 24 whereby the front end of the truck bed 18 is raised to result in the lift bed 18 being inclined rearwardly and downwardly as shown in FIGURE 1 in response to the hydraulic means 24 being caused to extend in length. The connecting means 22 and the hydraulic power means 24 are entirely conventional in character and those familiar with conventional trucks of the lift bed type will readily understand the structure and the method of operation and control of the position of the lift bed 18 by such means. For the purposes of the present invention it is suffice to note that the lift bed 18 can be caused, through appropriate operation of the hydraulic power means 24, to occupy the position shown thereof in FIGURE 1 or a substantially horizontal position of rest upon the frame 12 (not shown), and that the bed 18 can be supported at or moved between any two intermediate positions as may be desired by the operator.

The rectangular and substantially flat lift bed 18 is provided with upstanding side walls 26 and 28 and with an upstanding front wall 30. In the conventional manner the forward ends of the side walls 26 and 28 are secured to the ends of the front wall 30 to define junctures 32 and 34 therewith respectively. The lift bed 18 is provided with an upstanding rear wall or endgate structure designated generally at 36. The rear wall structure 36 comprises conventional outer panels or sections 38 and 40, and the opposite end extremities or edges of which are secured to the rear ends of the side walls 26 and 28 at 42 and 44 respectively.

The adjacent ends of the rear wall panels 38 and 40 are detachably secured at 46 and 48 to the opposite ends of a central rear wall section or panel 50.

The central rear wall section or panel 50 is as hereinafter described of novel character, and is such as to be substituted for and mounted in the same position as a conventional central rear wall panel such as would normally be connected to and extend between the outer rear wall panels or sections 38 and 40. In other words, the central rear wall or panel section 50 of this invention and illustrated in the drawings must be considered as having been substituted for a removed and discarded or set aside conventional panel, or considered as a conventional central panel modified to correspond to the illustrated and described panel 50. Those familiar with the rear wall structure conventionally provided for the lift beds or trucks designed primarily for farming or agricultural uses will recognize the outer wall panels 38 and 40 as being conventional, and will also recognize that the conventional central wall panel replaced by the novel rear wall panel 50 is such as to normally include a door or gate for discharging cargo therethrough.

As mentioned previously, the central rear wall panel or section 50 constitutes a departure from conventional structure, and more specifically such departure comprises the provision of a sump structure attached to and extending rearwardly from the lower portion of the rear wall 50 to define therewith a housing designated generally at 52. The housing 52 comprises a bottom wall 54 that has its forward edge fixedly secured to the bottom edge portion of the rear wall section 50, the bottom wall of the housing 52 being transversely horizontal but inclined rearwardly and downwardly in its longitudinal extent. The housing 52 includes side walls 56 and 58 along its opposite sides, and the forward edges of the side walls 56 and 58 are rigidly secured by any suitable means to the rear wall section 50. The top of the forward end portion of the housing 52 is defined by a top wall portion 60 that extends between the forward end portions of the upper edges of the side walls 56 and 58, and the forward edge of the top wall portion 60 terminates in close proximity to but in spaced relation to the rear wall panel 50 for a purpose presently to be explained. The top of the rear end portion of the housing 52 is defined by a top wall portion 62 that extends between the rear portions of the upper edges of the side walls 56 and 58. The space intervening between the adjacent edges of the top wall portions 60 and 62 constitutes an access opening 64 permitting access to the interior of the housing 52 through the top thereof, and such access opening 64 is normally closed by a cover 66 extending between the adjacent edges of the top wall portions 60 and 62, such cover 66 being hingedly connected to the top wall portion 60 by means of hinges 68 and 70, whereby the rear end of the cover 66 can be swung upwardly about the horizontal transverse axis established by the hinges 68 and 70.

Means is provided for releasably latching the cover 66 in the closed position shown thereof in FIGURE 9. Such latch means are illustrated in FIGURE 11 and comprise a pin 72 rotatably extending through the cover 66 adjacent the rear edge of the latter. The pin 72 is provided with a collar 74 fixed thereto, and a coiled compression spring 76 embraces the pin 72 with its opposite ends engaging the upper surface of the cover 66 and the underside of the collar 74 so as to resiliently urge upward movement of the pin 72. Upward movement of the pin 72 is limited by a nut 78 securely threaded upon the lower end of the pin 72 at a position below the cover 66. The upper end of the pin 72 is bent to form a handle portion 80 by means of which the pin 72 may be manually turned. The pin 72 has fixed thereto a radially extending finger 82 that can be rotated to a position selectively engageable under the lower surface of the top wall portion 62 as shown in FIGURE 11. It will be understood that in order to release the cover 66 from its latched condition, the handle 80 may be rotated approximately 90 degrees, whereupon the finger 82 disengages the undersurface of the top wall portion 62, and the cover 66 can then be raised by means of the handle 80. The cover 22 can, of course, be latched in its closed position by reversing the procedure just described.

It will be noted that the housing 52 is rearwardly tapered, particularly in its transverse horizontal dimensions, and it is to be noted hat the side walls 56 and 58 are rearwardly convergent, and that the transverse side edges of the cover 66 are correspondingly rearwardly convergent with the transverse extent of the cover 66 being such that lateral margins thereof project outwardly for a short interval beyond the corresponding side walls of the housing 52 so as to minimize any extent to which moisture may gain access to the interior of the housing 52.

The rear or minor end of the housing 52 is open so as to constitute a discharge or drain opening 84 for the housing 52. A door 86 normally closes the drain opening 84, the door 86 being hingedly secured to the rear top wall portion 62 by means of hinges 88 and 90. Means is provided for releasably latching the door 86 in its normal position closing the drain opening 84. The means for releasably latching the door 86 closed comprises a latch pin 92 mounted for vertical reciprocation along the rear face of the door 86 as viewed in FIGURE 9. The pin 92 is mounted to the door 86 and guided in its vertical reciprocation by means of a guide member 94 attached to the door 86. The latch pin 92 is provided with a collar 96 attached thereto, and a coiled compression spring 98 embraces the latch pin 92 intermediate the guide member 94 and the collar 96 in an arrangement such as to resiliently urge downward movement of the latch pin 92. The upper end portion of the latch pin 92 is bent to form a handle 100 which coacts with the guide member 94 to limit downward movement of the pin 92 and which also serves as a means whereby the latch pin 92 may be manually raised against the bias of the spring 98. The rearmost marginal portion 102 of the bottom wall 54 projects rearwardly of the rear edges of the side walls 56 and 58 and is inclined downwardly to constitute a camming surface for coaction with the beveled lower end 104 of the latch pin 92. The rearmost end portion 102 of the bottom wall 54 is provided with an opening 106 therethrough in an arrangement that the rearmost portion 102 of the bottom wall constitutes a latchkeeper for the latch pin 92. The arrangement is such that the latch pin 102 projects downwardly through the opening 106 when the door 86 is closed, and the door 86 can only be opened after unlatching the same by raising the handle 100. The door 86 will be latched in its closed position upon being forcibly swung to its closed position by reason of the fact that the lower end 104 of the pin 92 will be cammed upwardly over the surface of the bottom wall portion 102 until the pin 92 is in alignment with the opening 106, whereupon the pin 92 is projected through the opening 106 by action of the coiled compression spring 98.

The vertical height of the major forward end of the housing 52 is substantially less than that of the central rear wall portion 50, and the portion of the rear wall panel 50 in alignment with the forward end of the housing 52 effectively constitutes the front end wall of or closure of the front end of the housing 52. Since the transverse extent of the major or front end of the housing 52 is substantially that of the central rear wall portion 50, it follows that the transverse horizontal extent of the housing 52 is substantially less than the overall transverse extent of the rear wall structure 36.

The rear wall panel 50 is provided with a pair of laterally spaced openings 110 and 112 therethrough that open into the forward interior 14 of the housing 52. The openings 110 and 112 are immediately adjacent to the lower edge of the rear wall section 50 and the upper surface of the flat bed 18. In other words, the openings 110 and 112 afford communication between the cargo space above the flat bed 18 that is bounded by the upstanding walls 28, 26, 30 and 36 and the interior 114 of the housing 52. Such cargo space is designated by the reference numeral 116, and such cargo space 116 is partitioned into separate compartments 118 and 120 by means of an upstanding partition wall 122 having its forward end secured to the front wall 30 as indicated at 124 and having its rearmost end secured to the rear wall portion 50 intermediate the openings 110 and 112 as indicated at 126. The arrangement is such that the sole communication between the compartment 118 and the interior 114 of the housing 52 is by way of the opening 110, and the sole communication between the cargo compartment 120 and the interior of the housing 52 is by way of the opening 112.

Valve means designated generally at 126 is provided for controlling the communication afforded between the compartment 120 and the interior 114 of the housing 52. Such valve means 126 is of the gate type and comprises a valving plate or valving element 128 that is vertically reciprocable between a lowered position in which it closes the opening 112 and an upper position that opens or allows communication through the opening 112. The rectangular valving element 128 is slidingly guided in its vertical reciprocatory movements by means of having its lateral side margins 130 and 132 slidingly received in vertical slots 134 and 136 respectively that are defined by guide means 138 and 140 fixed to the rearmost side of the rear wall section 50 along the lateral extremities of the opening 112. As mentioned previously, the forward edge of the top wall portion 60 of the housing 52 is spaced from the rear side of the rear wall section 50, and this accommodates the guide means 138 and 140 which extend above the top of the housing 52 as shown in FIGURE 9. Such spacing of the top wall portion 60 also accommodates a valve actuating arm 142 which has its lower end attached to the valving plate 128 as indicated at 144. The upper end of the valve actuating arm 142 is pivotally connected to a valve actuating lever 146 that is disposed above the housing 52 and which extends transversely along the rear side of the rear wall section 50. The valve actuating lever 146 has one end pivotally connected to the rear wall section 50 by means of a pivot pin 148 carried by the rear wall section 50. The pivotal connection 150 established between the arm 142 and the lever 146 is disposed intermediate the longitudinal extent of the lever 146 and such pivotal connection 150 is such as to afford a modest degree of lost motion inasmuch as the arm 142 moves vertically along a straight line, whereas the pivotal connection 150 moves along an arc about the axis defined by the pivot pin 148. The free outer end portion 152 of the lever 146 constitutes a handle whereby the valving element 128 can be forcibly urged in its upward and downward vertical movements, such as to the dotted line position shown thereof at 154.

Valve means generally analogous to the previously described valve means 126 is provided for controlling the opening 110, these valve means being designated generally at 160, and comprising a valving element 162 guided for vertical reciprocatory movement by guide means 164 and 166. As in the case of the valve means 126, an actuating arm 168 is connected to the valving element 162, the upper end of the arm 168 being pivotally connected at 170 to an intermediate position along the extent of an actuating lever 172. One end of the valve actuating lever 172 is pivotally secured upon the pivot pin 148, and the outer end portion 174 of the lever 172 constitutes a handle whereby the valving plate 162 can be forced upwardly and downwardly.

Figure 4:
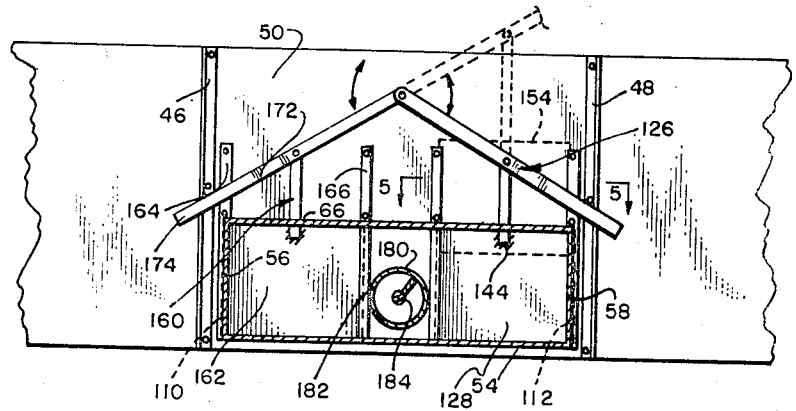
FIGURE 4 is an enlarged sectional detail view taken upon the plane of the section line 4—4 in FIGURE 1, an alternate position occupied by one of the valve actuator means being shown in dashed outline.
Figures 5, 6:
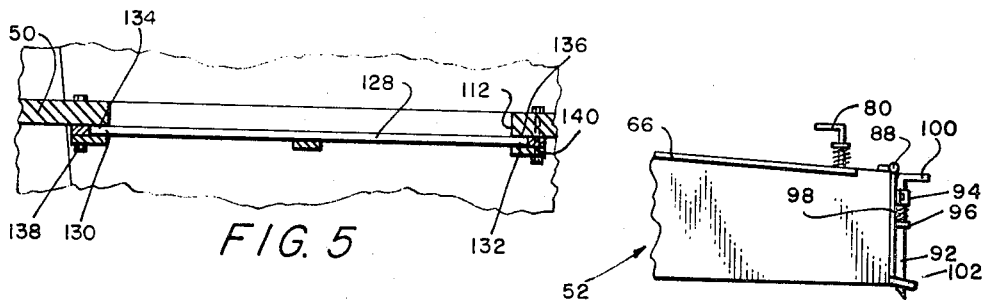
FIGURE 5 is a still further enlarged sectional detail view, this view being taken upon the plane of the section line 5—5 in FIGURE 4.
FIGURE 6 is an enlarged side elevational detail view of the rear end of the sump or housing illustrating the latch means provided in connection with the access and discharge doors of the housing.

As will be evident upon inspection of FIGURES 4 and 9, the valve actuation levers 146 and 172 extend oppositely from their common pivotal connection 148 to the rear wall section 50, and that such levers preferably are inclined downwardly from such pivotal connection 148 when the respective valves controlled thereby are both closed. Also it will be noted on inspection of FIGURE 9 that the remote or handle portion 152 and 174 of the levers 146 and 172 are rearwardly offset so as to enable a person to grasp such handles by the hand without coming into contact with the rear wall structure 36.

The housing 52 can be made of any suitable material such as wood or metal; however, preferably the housing 52 is made of sheet steel and can conveniently be 8 gauge. The valve means 126 and 160 are each preferably made in their entirety of metallic construction. The rear wall section or panel 50 is of metal, preferably steel; however, wood or any other suitable material can be employed if deemed necessary or expedient.

At a position intermediate the discharge openings 110 and 112 and at a position disposed at one side of the rear end of the patrition wall 122, the rear wall section 50 is provided with a substantially circular, auger accommodating opening 180 that is spaced above the bottom wall 54 of the housing 52. Auger means designated generally at 181 is provided, such auger means including an auger tube 184 in which is rotatably disposed a conventional helical auger vane 184. The auger tube 182 is received through the opening 180 so as to be in part supported by the rear wall panel 50, and the auger tube is inclined upwardly and forwardly as well as transversely with respect to the flat bed 18 in such an arrangement that the forward and upper end of the auger tube is disposed substantially directly above and in spaced relation to the upper end of the juncture 32 of the side wall 26 with the front wall 30 when the bed 18 is considered to be in its horizontal position.

It is to be understood that the opening 180 affords sufficient clearance for the auger tube 182 to enable the latter to be installed or removed as occasions may require. If desired or deemed expedient in order to avoid any leakage that might occur because of such clearance, any suitable packing material, not shown, can be forced into the clearage space after the tube 182 is installed.

Figure 7:
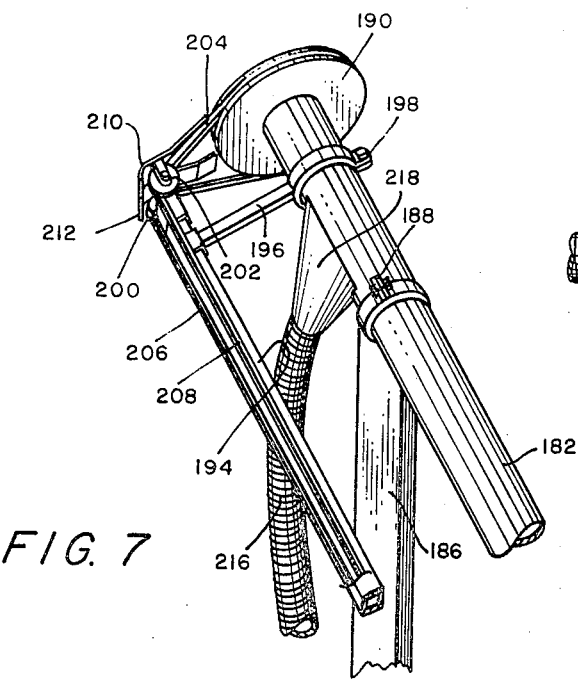
FIGURE 7 is an enlarged fragmentary isometric view of the means for driving the auger means.
Figure 8:
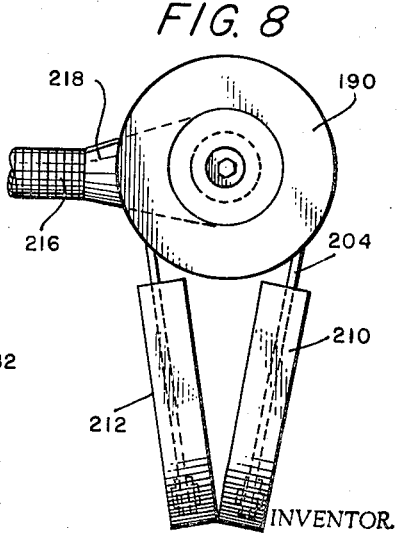
FIGURE 8 is an enlarged end view of the driven end of the auger, this view being taken from a plane normal to the axis of the auger.

A vertical support member 186 is secured to the juncture 32 so as to project vertically thereabove as shown in FIGURE 1 (the bed 18 being considered as lowered to its horizontal position). The upper end portion of the auger tube 182 is supported upon the support 186 and is detachably secured thereto by means of a split ring fastening device 188 as best shown in FIGURE 7. It will be understood that upon tightening of the split ring clamping device 188, the auger tube 182 is not only securely supported, but additionally is secured against axial movement relative to the support member 186. A drive pulley 190 is fixed to the helical auger vane at the upper end of the auger tube 182, and means is provided for driving the pulley 190 and the auger vane 184 attached thereto for rotation. Such means comprises a prime mover 192 in the form of a gasoline engine detachably mounted by suitable means upon the upper edge of the side wall 26 at a position intermediate the fore and aft extent of the latter. As will be understood, the gasoline engine constituting the prime mover 192 can conventionally include a clutch for selectively coupling and uncoupling the same from its load, and may additionally include control cables, not shown, whereby the throttle and the clutch thereof can be controlled from a remote location that may be more conveniently accessible to the operator. Inasmuch as such provisions are well known and do not in themselves constitute any inventive subject matter per se, illustration and detailed description of such structure is omitted as the same would not contribute to an understanding of the instant invention and might tend to obscure the actual invention.

A brace 194 has one end detachably secured to the prime mover 192 by means not shown, and adjacent its other end, the brace 194 is provided with a laterally extending arm 196 that is detachably secured by a split ring clamp 198 to the auger tube 182. A pair of idler pulleys 200 and 202 are mounted for rotation upon the end of the brace 194 remote from the prime mover 192. The gasoline engine constituting the prime mover 192 is provided with an output pulley, not shown, that is preferably subject to the control of a clutch as mentioned previously, and an endless belt 204 is entrained over such pulley and also over the previously mentioned pulley 190, with intermediate extents of the flights 206 and 208 of such endless belt 204 being entrained over the idler pulleys 200 and 202. In the preferred construction, guard plates 210 and 212 are fixed to the upper end of the brace 194 so as to overlie major portions of the extents of the endless belt 204 extending between the pulley 190 and the idler pulleys 200 and 202. Such provision, by virtue of being closely spaced to the pulleys 200 and 202, precludes any slack in the belt 204 from resulting in the latter becoming disengaged from the pulleys 200 and 202 as might otherwise occur (especially when the flights 206 and 208 are exposed to and caused to whip by high winds). Such provision also lessens any possibility of injury to the operator or any foreign object becoming caught between the belt 204 and any of the pulleys. Obviously, if deemed expedient or desired, a guard or shield may be provided to at least partially shield the entire extent of the belt 204 along the brace 194 and about the pulley of the prime mover 192.

It will be appreciated by those skilled in the art that the mounting of the prime mover 192 at the position shown thereof in FIGURE 1 not only makes it easier to mount and dismount the same, but it also makes it much easier to service the same. Additionally, the weight of the prime mover 192 is carried directly by side wall structure of the bed 18 rather than upon the auger tube 182. Thus, the auger tube 182 is not burdened by the weight of the prime mover 192, and furthermore, the auger tube 182 is not subjected to the vibration and fatigue that might result therefrom.

As clearly shown in FIGURE 1, the upper and discharge end of the auger tube 182 is coupled to a depending conduit means designated generally at 214; communication between the interiors of the auger tube 182 and the interior of the conduit means 214 being by way of an opening, not shown, in the underside of the auger tube 182 adjacent its upper end. The depending conduit means 214 comprises a flexible conduit portion 216, preferably metallic, connected directly to the auger tube 182 at 218 and having its other end connected at 220 to a non-flexible metallic conduit 222. The flexible portion 216 of the conduit means 214 enables the free end 224 of the conduit 222 to be moved about with considerable freedom as to a selection of a choice of sites to which material may be gravitationally directed to flow. The non-flexible portion 222 of the conduit means 214 can, if desired, be substantially longer than shown in FIGURE 1 so as to enable delivery to sites more remote; however, it is much preferred that the inflexible portion 216 of the conduit means 214 be of the conventional telescoping type, such that the same is axially extensible. The flexible portion 216 of the conduit means 214 enables placement of the inflexible portion 222 of the conduit means 214 within the cargo space of the truck bed 18 when the auger means 181 is not in use or when the lift bed 18 is lowered.

It will be noted that structure adjacent the upper end of the auger tube 182, the prime mover 192 and its driving connection to the auger, and the conduit means 214 are all on the left-hand side of the truck and are all therefore disposed in positions easily visible to the truck driver from the operator's cab. For example, the driver from the conventional left-hand driver's seat can properly position the truck and the conduits with respect to the intended cargo delivery site.

As mentioned previously, the auger tube 182 extends through the rear wall section 50 and into the interior of the housing 52. As also mentioned previously, the bottom wall 54 of the housing 52 is inclined rearwardly and downwardly, and it will be noted that such inclination of the bottom wall 54 is such as that the same is in substantial spaced parallelism to the auger tube 182. The auger tube 182 has an open lower end 230 (see FIGURE 9) that is spaced substantially from the rear end of the housing 52, and the helical auger vane 184 projects through the open lower end 230 of the auger tube 182 to terminate in a free end 232 that is closely spaced to the rear end wall or closure door 86 of the housing 52 when the door 86 is closed. The exposed extent of the helical auger vane 184, that is, the extent of the helical auger vane 184 rearwardly of the end 230 of the auger tube 182 serves to agitate contents of the housing 52 and the length of such extent tends to control the rate at which material is caused to be drawn into the auger tube 182 by the helical auger vane 184. Means is provided to vary in effect the exposed extent of the helical auger vane 184 from the auger tube 182. Such means comprises a cylindrical sleeve 234 slidable upon the exterior of the auger tube 182, the arrangement being such that the sleeve 234 can be axially moved rearwardly so as to embrace or surround a variable extent of the part of the helical auger vane 184 that projects rearwardly from the end 230 of the auger tube 182. Such arrangement serves for all practical purpose to make the rearward extent of length of the auger tube 182 variable. Means is provided for releasably securing the sleeve 234 in axially adjusted position upon the auger tube 182, and such means comprises the forward end portion of the sleeve 234 being provided with a plurality of circumferentially spaced longitudinal slots such as those indicated at 236, and such slotted forward extent of the sleeve 234 being embraced by a releasable split clamp 238. It will be evident that tightening of the threaded means 240 constituting a part of the clamp 238 serves to force the slotted forward portion of the sleeve 234 into frictional engagement with the external surface of the auger tube 182.

It is to be noted that the sleeve 234 can be adjusted and secured in a rearmost position such that if desired the rearmost edge 242 of the sleeve 234 in conjunction with the closed door 86 serves to cut off the entry of material within the housing 52 against entry into the auger tube 182.

It will be seen on inspection of the drawings that the housing 52 is somewhat asymmetrical with respect to the longitudinal axis of the bed 18, and this is, as should be evident, for the purpose of the housing 52 being generally conformable to the lateral inclination of the auger tube 182.

The operation in use of the invention will be readily understood. Assume initially that the lift bed 18 is in its horizontal position, and that the cargo compartments 118 and 120 as well as the interior 114 of the housing 52 are empty. Furthermore, assume that the cover 66 and the door 86 are closed. The truck 10 is driven to the location of a source of supply of seed wheat, for example, and the compartment 118 is filled or has placed therein the desired amount of seed wheat, and the truck 10 is then driven to a source of bulk fertilizer, and such bulk fertilizer is placed in the compartment 120. The truck 10 is then driven to the location at which wheat planting or drilling operations are being conducted. The hydraulic power unit 24 is then operated to lift the bed 18 to such an extent as may be necessary that gravitational flow of wheat seed and fertilizer can occur through the openings 110 and 112 to the interior of the housing 52, assuming that the respective valves are open. The conduit means 214 is then arranged to gravitationally direct augered material into the wheat drill, and the prime mover 192 is started and the clutch engaged. The valve means 160 can then be actuated to allow seed wheat to enter the housing 52 from the compartment 118, whereupon such seed wheat is augered to the upper end of the conduit means 214 and from such position the same is gravitationally directed to the wheat drill. As soon as the wheat drill has received a predetermined amount of seed wheat less than that actually desired (allowance being made for the amount of seed wheat then remaining in the housing 52 and in the auger tube 182) the valve means 160 is then actuated to close the opening 110, and the valve means 126 is then operated to open the opening 112, whereupon the delivery of fertilizer to the wheat drill will commence as soon as the volume of seed wheat previously in the housing 52 and in the auger tube 182 has been delivered. When the amount of fertilizer that it is desired to place in the drill has been delivered, the clutch of the gasoline engine 192 can be disengaged or the gasoline engine may be stopped. When it next becomes necessary to fill the wheat drill or to fill another wheat drill, initial delivery may be made of fertilizer followed by delivery of seed wheat.

As previously explained, the sleeve 234 can be adjusted to control the rate at which material is augered. When it is desired to make an adjustment of the position of the sleeve 234, the lift bed 18 can be lowered, and the cover 66 raised to afford access to the sleeve 234 so as to permit adjustment.

The illustrated and described apparatus enables the discharge of a small unit quantity of a selected material. This function is obtained upon allowing the housing 52 to become charged with a selected one of the materials by appropriate tilting of the bed 18 and operation of the valve means 160 and 126 followed by closure of such valve means. Obviously, the interior of the housing 52 can be charged with either one of the materials separated by the partition wall 122 or by portions from each of such separated compartments. After the housing 52 has been charged as desired, the valve means 160 and 126 are closed and the bed 18 is raised if not already in an elevated position. The door 86 is then opened so that the contents of the housing 52 can drain through the minor open end 84 of the latter into a bag held under the minor end of the housing 52 or into an appropriately sized container placed under the minor end of the housing 52. This capability is particularly advantageous when small quantities of material are desired and is quite a labor saving convenience as compared to hand filling a bag or other container from directly within the cargo space.

The contents of either one of the compartments can be circulated if desired as may be necessary to avoid caking by directing the conduit means 214 into the appropriate compartment and opening the valve means associated therewith while the auger means 181 is in operation. Also, the conduit means 214 can be directed into the appropriate compartment and the auger means 181 operated with both of the valve means 160 and 126 closed so as to essentially entirely empty the housing 52 and the auger tube 182.

The door or closure gate 86 is of course not only useful in the discharging of a metered quantity of a selected cargo material as previously explained, but the entire cargo of the bed 18 can be discharged through the rear end of the housing 52 if desired, as when wheat is delivered to the subsurface wheat receiver of a grain elevator. If desired, the contents of the housing 52 and most of the contents (prime mover 192 inactive) of the auger tube 182 can be discharged through the rear end of the housing 52. When the housing 52 is empty, the cover 66 can be raised for the purpose of giving the interior of the housing 52 and its contents a thorough cleaning.

From the foregoing, many and varied other uses in operation of the illustrated and described embodiments of the invention are possible, and will readily come to mind.

Obviously, the illustrated and described embodiment of the invention is susceptible to numerous variations in detail without departing from the spirit or scope of the invention. In this regard it is to be emphasized that the invention has been elaborately described in detail for the purpose of conveying a full and complete understanding of the principles involved, and any narrowness of scope of the invention is not to be implied by such elaborate description. Accordingly, attention is directed to the appended claims in order to ascertain the actual scope of the invention.

I claim:

1. An attachment for use with trucks of the type having a planar tiltable bed provided with upstanding front, rear and side walls, said attachment comprising a vertical closure wall adapted to be secured to the walls of the bed and also adapted to constitute a portion of the rear wall of the tiltable bed, a sump structure attached to and extending rearwardly from the closure wall to define therewith a housing, said housing including a bottom wall inclined rearwardly and downwardly from adjacent the bottom of the closure wall, said closure wall being provided with a discharge opening therethrough that is adjacent the bottom of the closure wall and which opens into the interior of the housing, valve means for selectively opening and closing said discharge opening, said closure wall additionally being provided with an auger opening, and auger means for removing augerable material from within the housing, and for discharging such material at a remote location, said auger means having an inlet within the housing and a relatively elevated discharge outlet, with said auger means including an auger tube extending in closely spaced relationship through the auger opening and being inclined upwardly and forwardly.

2. The combination of claim 1, including means disposed forwardly of the closure wall and depending from the auger means for supporting the latter.

3. The combination of claim 2, wherein the bottom wall of the housing has substantially the same inclination as the auger tube, and including flexible conduit means mounted on the auger tube in communication with the discharge outlet for directing augered material by gravity flow to a selected site.

4. The combination of claim 1, wherein said auger means includes a rotatable helical vane in and projecting from an open lower end of the auger tube that constitutes the inlet of the auger means, and a sleeve axially slidable upon the lower end of the auger for projecting an adjustable axial extent from the lower end of the auger tube, means for securing the sleeve in axially adjusted position, said housing having an access opening in the top thereof, and a movable closure member for selectively closing the access opening.

5. The combination of claim 4, wherein said housing includes a dump opening at its rearmost extremity, and a closure member of selectively closing said dump opening.

6. The combination of claim 1, wherein the housing is rearwardly tapered and terminates at its rear end in a rear wall normally closing the rear end of the housing, said rear wall being hingedly mounted for selectively opening the rear end of the housing, and latch means for releasably securing the rear wall in its normal housing closing position.

7. The combination of claim 1, including a vertical partition wall extending forwardly from the closure wall, said partition wall being disposed laterally to one side of the discharge opening, said closure wall being provided with a second discharge opening therethrough with the partition wall being disposed laterally intermediate the first mentioned and the second discharge opening, and a second valve means for selectively opening and closing the second discharge opening.

8. The combination of claim 7, wherein the first mentioned valve means and the second valve means each includes a valving element mounted on the closure wall for independent vertical movement between upper and lower positions respectively opening and closing the first mentioned and the second discharge openings respectively, and said first mentioned and second valve means including a pair of oppositely extending valve actuator levers having their adjacent ends pivotally secured to the closure wall and respectively being pivotally connected intermediately their ends to the valving elements, whereby the remote ends of the levers can be manually moved vertically to control the extent to which the discharge openings are opened independently of each other.

9. In combination with a truck of the class having a flat lift bed provided with upstanding front, side and rear walls, the improvement therewith for unloading cargo comprising a sump structure attached to and extending rearwardly from the rear wall of the bed to define therewith a housing rearward of the rear wall of the lift bed, said housing having a horizontal transverse extent substantially less than the corresponding extent of the rear wall of the lift bed, said rear wall having a discharge opening therethrough adjacent the bottom thereof that communicates with the interior of the housing, valve means for closing the discharge opening, said rear wall having an auger accommodating opening therethrough that opens into the housing, auger means for removing and elevating augerable material from the housing, said auger means including an auger tube extending through the auger accommodating opening with the tube being inclined upwardly and forwardly from its lower end which is disposed in the housing to its upper end which is disposed at a height greater than that of the front and side walls of the lift bed, said auger means including a helical auger vane rotatable in the tube, means including a prime mover operatively connected to the vane adjacent the upper end of the tube for rotating the vane, and means depending from the tube at a position forward of the rear wall of the lift bed for supporting the auger means upon the upstanding walls of the lift bed, and means for supporting the prime mover upon the upstanding walls of the lift bed.

10. The combination of claim 9, wherein the rear wall of the lift bed includes a center wall section extending between a pair of outer wall sections, said sump structure being attached solely to the center wall section, said center wall section being separable from and detachably secured to the outer wall sections.

11. The combination of claim 9, wherein the auger tube is laterally inclined with respect to the longitudinal axis of the lift bed and the upper end thereof is disposed in spaced relation substantially directly above the juncture of one of the side walls with the front wall of the lift bed, substantially vertical means supporting the upper end portion of the tube upon the upstanding walls of the lift bed adjacent said juncture of such walls, said prime mover being mounted upon the upper edge of said one side wall at a position intermediate the front and rear walls, pulley and belt means drivingly connecting the prime mover to the vane, and flexible conduit means connected to and depending from the auger tube adjacent the upper end of the latter to direct augered material by gravity flow to selected sites.

12. The combination of claim 9, wherein the rear wall is provided with a second discharge opening communicating with the interior of the housing, a second valve means for closing the second discharge opening, said second discharge opening being laterally spaced from the first mentioned discharge opening, and an upstanding partition wall extending forwardly from the rear wall of the lift bed with the rearmost extremity of the partition wall having a juncture with the rear wall intermediate the discharge openings, and with the foremost extremity of the partition wall having a juncture with one of the other upstanding walls of the lift bed, whereby the partition wall can isolate differing augerable materials carried on the lift bed, and wherein the differing materials can be selectively allowed to gravitationally flow into the housing.

13. The combination of claim 12, wherein the juncture of the partition wall with the rear wall of the lift bed is disposed laterally to one side of the auger accommodating opening.

14. The combination of claim 9, wherein the housing is rearwardly tapered to terminate in a minor rear end, and the rearmost end of the auger means being disposed in the rear end portion of the interior of the housing.

15. The combination of claim 14, wherein the housing includes a bottom wall that is downwardly and rearwardly inclined at substantially the same degree of inclination as the auger tube.

16. The combination of claim 9, wherein the rear end of the housing is normally closed by a hinged door that is swingable to a position opening the rear end of the housing, and a latch means for releasably securing the door in its normal housing closing position.

17. The combination of claim 16, wherein the rear end of the helical vane projects from an open rear end of the auger tube, and means for adjustably extending the effective length of the rear end portion of the auger tube, said last means comprising a cylindrical sleeve axially slidable on the rear end portion of the tube, and means for releasably securing the sleeve against movement on the tube.

18. The combination of claim 9, wherein the rear end of the helical vane projects from an open rear end of the auger tube, means for adjustably extending the effective length of the rear end portion of the auger tube, said last means comprising a cylindrical sleeve axially slidable on the rear end portion of the tube, and means for releasably securing the sleeve against movement on the tube, the housing having an access opening in the top thereof, a hingedly mounted cover for the access opening selectively movable between positions opening and closing the access opening.

References Cited

UNITED STATES PATENTS

| | | | |
|---|---|---|---|
| 2,765,936 | 10/1956 | Phillips | 214—83.32 |
| 3,391,778 | 7/1968 | Lasiter | 214—83.32 XR |

ALBERT J. MAKAY, Primary Examiner

U.S. Cl. X.R.

214—83.32